United States Patent
Klassen et al.

(10) Patent No.: US 8,209,634 B2
(45) Date of Patent: Jun. 26, 2012

(54) PREVIEWING A NEW EVENT ON A SMALL SCREEN DEVICE

(75) Inventors: Gerhard D. Klassen, Waterloo (CA); Craig A. Dunk, Guelph (CA); Christopher R. Wormald, Kitchener (CA)

(73) Assignee: Research In Motion Limited, Waterloo (CA)

(*) Notice: Subject to any disclaimer, the term of this patent is extended or adjusted under 35 U.S.C. 154(b) by 987 days.

(21) Appl. No.: 10/784,781

(22) Filed: Feb. 24, 2004

(65) Prior Publication Data

US 2005/0120306 A1 Jun. 2, 2005

Related U.S. Application Data

(60) Provisional application No. 60/525,958, filed on Dec. 1, 2003.

(51) Int. Cl.
*G06F 3/048* (2006.01)

(52) U.S. Cl. ........ 715/859; 715/736; 715/739; 715/752; 715/753; 715/758; 715/759; 715/837; 715/861; 715/864; 715/710; 715/842; 715/851

(58) Field of Classification Search .................. 715/700, 715/842, 851, 710, 736, 739, 752, 753, 758, 715/759, 837, 859, 861, 864
See application file for complete search history.

(56) References Cited

U.S. PATENT DOCUMENTS

| | | | |
|---|---|---|---|
| 5,333,256 A | 7/1994 | Green et al. | |
| 5,617,526 A | 4/1997 | Oran et al. | |
| 5,634,102 A | 5/1997 | Capps | |
| 5,793,365 A * | 8/1998 | Tang et al. | 715/758 |

(Continued)

FOREIGN PATENT DOCUMENTS

EP 0 943 987 A1 9/1999

(Continued)

OTHER PUBLICATIONS http://www.nokia.com/EUROPE_NOKIA_COM_3/r2/support/tutorials/9210i/english/intro.html, 2002, p. 11.* Nokia 9210i Communicator, 2002, http://www.nokia.com/EUROPE_NOKIA_COM_3/r2/support/tutorials/9210i/english/intro.html, PDF pp. 1-7.*
Nokia 9210i Communicator, 2002, Nokia.*
Duarte et al., WO 03/014905 A2, Feb. 20, 2003.*
Ask Search, http://www.ask.com/web?qsrc=1&o=0&l=dir&q=wireless+correspondents+new+messages.*

(Continued)

*Primary Examiner* — Boris Pesin
*Assistant Examiner* — John Heffington
(74) *Attorney, Agent, or Firm* — Norton Rose Canada LLP (57) ABSTRACT

Method and apparatus for previewing new events in a computing device having a plurality of applications for managing respective events are described. Individual applications are each represented by an application icon on a screen of a graphical user interface for the device. When a new event occurs, particularly when the new event relates to a specific one of a plurality of similar applications, the invention provides a convenient way to denote which application relates to the event. In response to a new event of a one of the applications, the application's icon is visually modified to notify of the new event. A visual modification may be determined in response to the new event, for example, to preview a content of the event. The visual modification may include a count of all new events that remain to be disposed. On a selection of the visually modified icon, additional previewing may be provided. Activation of the application having a visually modified application icon may be configured to automatically initiate the application at the new event.

18 Claims, 9 Drawing Sheets

U.S. PATENT DOCUMENTS

| | | | |
|---|---|---|---|
| 5,872,521 A * | 2/1999 | Lopatukin et al. | 340/7.52 |
| 5,960,173 A * | 9/1999 | Tang et al. | 709/201 |
| 5,990,887 A * | 11/1999 | Redpath et al. | 715/758 |
| 6,131,046 A * | 10/2000 | Sano et al. | 455/566 |
| 6,169,911 B1 * | 1/2001 | Wagner et al. | 455/566 |
| 6,346,952 B1 * | 2/2002 | Shtivelman | 715/758 |
| 6,385,459 B1 | 5/2002 | Lawrence et al. | |
| 6,385,662 B1 | 5/2002 | Moon et al. | |
| 6,393,307 B1 * | 5/2002 | Kim | 455/566 |
| 6,396,518 B1 | 5/2002 | Dow et al. | |
| 6,424,354 B1 | 7/2002 | Matheny et al. | |
| 6,430,405 B1 * | 8/2002 | Jambhekar et al. | 455/403 |
| 6,434,599 B1 * | 8/2002 | Porter | 709/204 |
| 6,466,236 B1 | 10/2002 | Pivowar et al. | |
| 6,493,547 B1 * | 12/2002 | Raith | 455/405 |
| 6,519,629 B2 * | 2/2003 | Harvey et al. | 709/204 |
| 6,539,421 B1 * | 3/2003 | Appelman et al. | 709/206 |
| 6,628,194 B1 | 9/2003 | Hellebust et al. | |
| 6,691,159 B1 * | 2/2004 | Grewal et al. | 709/219 |
| 6,697,840 B1 * | 2/2004 | Godefroid et al. | 709/205 |
| 6,725,228 B1 * | 4/2004 | Clark et al. | 1/1 |
| 6,788,949 B1 * | 9/2004 | Bansal | 455/519 |
| 6,842,795 B2 * | 1/2005 | Keller | 710/15 |
| 6,907,447 B1 * | 6/2005 | Cooperman et al. | 709/203 |
| 6,970,906 B1 * | 11/2005 | Parsons et al. | 709/204 |
| 6,981,223 B2 * | 12/2005 | Becker et al. | 715/753 |
| 6,993,574 B2 * | 1/2006 | Hall | 709/219 |
| 7,003,279 B2 * | 2/2006 | Nickum | 455/405 |
| 7,127,685 B2 * | 10/2006 | Canfield et al. | 715/842 |
| 7,275,215 B2 * | 9/2007 | Werndorfer et al. | 715/752 |
| 7,284,207 B2 * | 10/2007 | Canfield et al. | 715/842 |
| 7,379,066 B1 * | 5/2008 | Ostermann et al. | 345/473 |
| 7,386,535 B1 * | 6/2008 | Kalucha et al. | 1/1 |
| 7,493,573 B2 * | 2/2009 | Wagner | 715/864 |
| 7,596,540 B2 * | 9/2009 | Tzruya et al. | 706/47 |
| 7,606,866 B2 * | 10/2009 | Mora | 709/207 |
| 7,631,266 B2 * | 12/2009 | Werndorfer et al. | 715/752 |
| 7,743,340 B2 * | 6/2010 | Horvitz et al. | 715/808 |
| 7,802,187 B2 * | 9/2010 | Yoshida | 715/710 |
| 7,813,488 B2 * | 10/2010 | Kozdon et al. | 379/201.04 |
| 7,882,434 B2 * | 2/2011 | Slotznick et al. | 715/710 |
| 7,900,148 B1 * | 3/2011 | Canfield et al. | 715/752 |
| 7,921,368 B2 * | 4/2011 | Moody et al. | 715/751 |
| 2002/0026483 A1 | 2/2002 | Isaacs et al. | |
| 2002/0035613 A1 * | 3/2002 | Hirayama | 709/218 |
| 2002/0130904 A1 * | 9/2002 | Becker et al. | 345/753 |
| 2002/0138584 A1 * | 9/2002 | Fujimoto et al. | 709/206 |
| 2002/0160817 A1 * | 10/2002 | Salmimaa et al. | 455/566 |
| 2002/0194379 A1 * | 12/2002 | Bennett et al. | 709/246 |
| 2003/0013483 A1 | 1/2003 | Ausems et al. | |
| 2003/0052915 A1 * | 3/2003 | Brown et al. | 345/752 |
| 2003/0131023 A1 * | 7/2003 | Bassett et al. | 707/200 |
| 2003/0167310 A1 | 9/2003 | Moody et al. | |
| 2003/0210265 A1 * | 11/2003 | Haimberg | 345/758 |
| 2004/0056893 A1 * | 3/2004 | Canfield et al. | 345/753 |
| 2004/0090469 A1 * | 5/2004 | Moon et al. | 345/846 |
| 2004/0155908 A1 * | 8/2004 | Wagner | 345/854 |
| 2004/0172455 A1 * | 9/2004 | Green et al. | 709/207 |
| 2004/0172456 A1 * | 9/2004 | Green et al. | 709/207 |
| 2004/0225901 A1 * | 11/2004 | Bear et al. | 713/300 |
| 2004/0229200 A1 * | 11/2004 | McKeon et al. | 434/350 |
| 2005/0047563 A1 * | 3/2005 | Fellenstein et al. | 379/88.22 |
| 2005/0055405 A1 * | 3/2005 | Kaminsky et al. | 709/206 |
| 2005/0071736 A1 * | 3/2005 | Schneider et al. | 715/500 |
| 2005/0091609 A1 * | 4/2005 | Matthews et al. | 715/804 |
| 2005/0114777 A1 * | 5/2005 | Szeto | 715/710 |
| 2005/0117733 A1 * | 6/2005 | Widger et al. | 379/221.05 |
| 2005/0120306 A1 | 6/2005 | Klassen et al. | |
| 2005/0138183 A1 * | 6/2005 | O'Rourke et al. | 709/228 |
| 2005/0165880 A1 * | 7/2005 | Moody et al. | 709/200 |
| 2005/0248437 A1 * | 11/2005 | Hellebust et al. | 340/7.51 |
| 2006/0007051 A1 * | 1/2006 | Bear et al. | 345/1.1 |
| 2006/0020904 A1 | 1/2006 | Aaltonen et al. | |
| 2006/0030295 A1 | 2/2006 | Adams et al. | |
| 2006/0084450 A1 * | 4/2006 | Dam Nielsen et al. | 455/466 |
| 2006/0256130 A1 * | 11/2006 | Gonzalez | 345/619 |
| 2006/0284787 A1 * | 12/2006 | Bear et al. | 345/1.1 |
| 2007/0038718 A1 * | 2/2007 | Khoo et al. | 709/206 |
| 2007/0060206 A1 * | 3/2007 | Dam Nielsen et al. | 455/566 |
| 2007/0129068 A1 * | 6/2007 | Ishigaki | 455/414.1 |
| 2007/0195007 A1 * | 8/2007 | Bear et al. | 345/1.1 |
| 2007/0213099 A1 * | 9/2007 | Bast | 455/566 |
| 2008/0200215 A1 * | 8/2008 | De Bast | 455/566 |
| 2008/0220751 A1 * | 9/2008 | De Bast | 455/414.2 |
| 2008/0282162 A1 * | 11/2008 | Lincke et al. | 715/710 |
| 2009/0006958 A1 * | 1/2009 | Pohjola et al. | 715/710 |
| 2009/0006959 A1 * | 1/2009 | Kalenius et al. | 715/710 |
| 2009/0288004 A1 * | 11/2009 | Strandell et al. | 715/710 |
| 2010/0192064 A1 * | 7/2010 | Beppu et al. | 715/710 |

FOREIGN PATENT DOCUMENTS

| | | |
|---|---|---|
| JP | 2003271277 | 9/2003 |
| WO | WO03014905 A2 | 2/2003 |

OTHER PUBLICATIONS

Ask Search, http://www.ask.com/web?qsrc=1&o=0&l=dir&q=telephone+%28correspondents+or+cont....*

Ask Search, http://www.ask.com/web?gsrc=1&o=0&l=dir&q=+wireless+%28correspondents+or+conta....*

Ask Search, http://www.ask.com/web?gsrc=1&o=0&l=dir&q=+phone+%28correspondents+or+contact....*

Ask Search, http://www.ask.com/web?q=correspondents+new+messages&search=&qsrc=364&o=0&l=....*

Response to Examination Report issued by the Canadian Intellectual Property Office against corresponding Canadian Application No. 2,548,598 dated May 20, 2011.

Examiner's Requisition issued by the Canadian Intellectual Property Office against corresponding Canadian Application No. 2,727,763 dated Mar. 21, 2011 along with Applicant's response dated Jun. 21, 2011.

Examiner's Requisition issued by the Canadian Intellectual Property Office against corresponding Canadian Application No. 2,732,050 dated Apr. 14, 2011 along with Applicant's response dated Jul. 13, 2011.

Examiner's Search Report and Written Opinion issued by the Intellectual Property Office of Singapore against corresponding Singapore Patent Application No. 200804162-6 dated Apr. 12, 2011.

Summons to attend oral proceedings prusuant to Rule 115(1) EPC in corresponding European Patent Application No. 08168419.3 dated Feb. 2, 2011.

Response from Barker Brettell to European Patent Office dated May 12, 2011 to summons to attend oral proceedings in corresponding European Patent Application No. 08168419.3.

First, Second and Third Auxiliary Requests dated Jun. 14, 2011.

"10 Minute Guide to Pocket PC 2002"; Copyright 2003 by Que; XP007916815; ISBN 0-7897-2797-8; Library of Congress Catalog Card No. 2002103976; U.S.A.; Sep. 2002; Wiegand, G. et al.

Response from Barker Brettell to European Patent Office dated Jun. 1, 2011 to Extended European Search Report in corresponding European Patent Application No. 10177958.5.

EPO to Barker Brettell dated Aug. 22, 2011; Provision of the minutes of the oral proceedings dated Jun. 14, 2011, in accordance with Rule 124(4)EPC in corresponding European Patent Application No. 08168419.3.

EPO to Barker Brettell dated Aug. 22, 2011; Decision to refuse a European Patent application at the oral proceedings dated Jun. 14, 2011 in corresponding European Patent Application No. 08168419.3.

Allen & Gledhill to Registrar of Patents, Singapore; Response to Written Opinion in divisional Singapore patent application No. 200804162-6 dated Sep. 12, 2011.

Notice of Allowance along with English translation of same, issued by the Japanese Patent Office in connection with corresponding Japanese Patent Application No. 2006-541762 dated Dec. 3, 2010.

* cited by examiner

PREVIEWING A NEW EVENT ON A SMALL SCREEN DEVICE

CROSS-REFERENCE TO RELATED APPLICATION

This application claims the benefit of U.S. Provisional Patent Application No. 60/525,958 filed Dec. 1, 2003.

FIELD OF THE INVENTION

The present invention relates generally to wireless communication devices, and more particularly to graphical user interfaces for controlling such devices.

DESCRIPTION OF THE RELATED ART

With the proliferation of communications services available on wireless mobile devices, it becomes increasingly complex to create a single device that can excel at many different functions. Many critics claim that a wireless telephone device can never make a good handheld personal digital assistant (PDA) device and a handheld PDA device will never make a good wireless telephone. It is also said that only teenagers are using Instant Messaging (IM) services or Short Message Services (SMS) to exchange messages with friends and acquaintances and that such users should get an entirely different wireless mobile device. However, many users of wireless handheld devices desire to have multiple services and functionality on a single device.

Representing multiple services and functions to a user on a single wireless mobile device presents a number of challenges to the designer of a user interface, particularly a graphical user interface (GUI), for controlling the device. Wireless devices are usually small relative to less portable computing devices such as laptops and desktop computers. Inherently then, a visual display such as an LCD or other screen component of the wireless mobile device has a small display area.

Typically, GUIs for wireless mobile devices comprise a main or home screen and one or more sub-screens that may be navigated from the main screen. Notification icons are often rendered on a portion of the main screen to indicate a new event such as the receipt of a new IM message, electronic mail (e-mail) or other service event such as a calendar reminder or alarm and other status information such as time, date and battery life. For each type of service or function available via the device, a graphical image or icon is often rendered on a major portion of the main screen, which icon may be selected using a cursor or other means to launch a specific GUI for the selected service or function.

A user may subscribe to multiple similar services and have these services available via a single wireless mobile device. For example, a user may subscribe to more than one Instant Message-type service, such as AOL™ Instant Messenger (AIM™), ICQ™, Microsoft Network™ (MSN™), Yahoo!™ Messenger and Quick Messaging™. Alternatively or as well, a user may have a corporate and personal e-mail account coupled to the wireless mobile device. When a user is notified of a new event such as a new IM message, the user is required to check each of their IM service applications separately, via their respective activation icons, to determine which IM service is responsible for the new event. Checking each service is inconvenient. Moreover, there is a demand to have information made available to a user quicker than previously available in order to optimize the control of the wireless device.

Accordingly, there is a resulting need for a method and apparatus that addresses one or more of these shortcomings.

SUMMARY

The invention relates to a method, graphical user interface and apparatus for notifying and previewing a new event on a display of a device.

In accordance with a first aspect of the invention, there is provided a method for a computing device having a plurality of applications for managing respective events, individual ones of said applications each represented by an application icon on a screen of a graphical user interface for the device. The method for previewing new events on the screen comprises, in response to a new event of a one of said applications, visually modifying the one of said applications' icon to notify of the new event. In response to the visually modified icon, a user may invoke the one of said applications.

The one of said applications may be monitored to determine an occurrence of the new event. Further, the first aspect may comprise determining a visual modification for the one of said applications' icon in response to the new event; and using said visual modification when visually modifying. Determining a visual modification may comprise maintaining a count of new events for the one of said applications and visually modifying the one of said applications' icon may comprise displaying a preview of a content of the new event. Displaying a preview can be responsive to a user action, such as an interaction with the modified icon. Displaying a preview of a content can comprise displaying a dialog box over a portion of the main screen.

In one embodiment, the method comprises, in response to an activation of the one of said applications having its icon visually modified to notify of the new event, automatically navigating through the one of said applications to the new event.

In one embodiment, the device comprises at least one of a data communication device and a voice communication device and at least some of said plurality of applications manage communications capabilities associated with the device. As such, the events of said at least some of said plurality of applications comprise communication events. For example, the device may be a wireless device.

In a second aspect, in a computing device having a controller coupled to a memory, the memory storing a plurality of applications for managing respective events, there is provided a graphical user interface (GUI) for the applications. The GUI comprises a main screen for displaying on the computing device, the screen comprising a plurality of icons, each icon associated with one of the plurality of applications; at least one monitoring component to determine the occurrence of new events of the applications; and at least one icon modifying component to modify a one of the icons for display on the main screen in response to a new event of the application associated with the one of the icons to notify of the new event.

In a third aspect there is provided a wireless handheld device comprising a controller; a memory coupled to the controller, the memory storing a plurality of applications for execution by the controller to manage respective events and a graphical user interface (GUI) for the applications. The GUI comprises a main screen for displaying on the device, the screen comprising a plurality of icons, each icon associated with one of the plurality of applications; at least one monitoring component to determine the occurrence of new events of the applications; and at least one icon modifying component to modify a one of the icons for display on the main screen in response to a new event of the application associated with the one of the icons to notify of the new event.

BRIEF DESCRIPTION OF THE DRAWINGS

Embodiments of present invention will now be described by way of example with reference to attached figures, wherein.

DETAILED DESCRIPTION

Method and apparatus for previewing new events in a computing device having a plurality of applications for managing respective events are described. Individual applications are each represented by an application icon on a screen of a graphical user interface for the device. When a new event occurs, particularly when the new event relates to a specific one of a plurality of similar applications, the invention provides a convenient way to denote which application relates to the event. In response to a new event of one of the applications, the application's icon is visually modified to notify of the new event. A visual modification may be determined in response to the new event, for example, to preview a content of the event. The visual modification may include a count of all new events that remain to be disposed. On a selection of the visually modified icon, additional previewing may be provided. Activation of the application having a visually modified application icon may be configured to automatically initiate the application at the new event.

Figure 1:
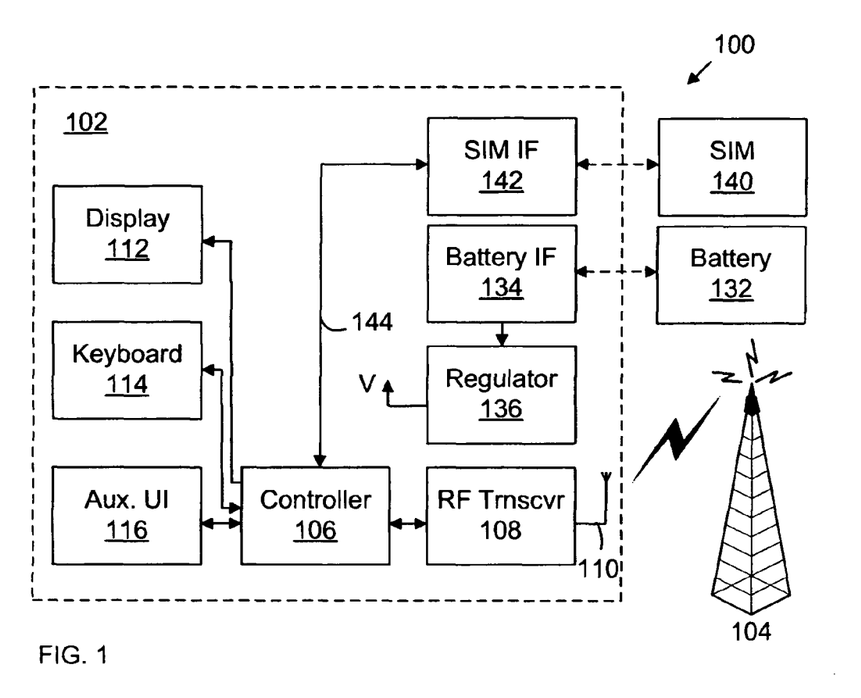
FIG. 1 is a block diagram which illustrates pertinent components of a wireless communication device which communicates within a wireless communication network in accordance with the prior art.

FIG. 1 is a block diagram of a communication system 100 which includes a mobile station 102 which communicates through a wireless communication network 104 symbolized by a station. Mobile station 102 preferably includes a visual display 112, a keyboard 114, and perhaps one or more auxiliary user interfaces (UI) 116, each of which are coupled to a controller 106. Controller 106 is also coupled to radio frequency (RF) transceiver circuitry 108 and an antenna 110.

Typically, controller 106 is embodied as a central processing unit (CPU) which runs operating system software in a memory component (not shown). Controller 106 will normally control overall operation of mobile station 102, whereas signal processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard, is normally provided for entering data for storage in mobile station 102, information for transmission to network 104, a telephone number to place a telephone call, commands to be executed on mobile station 102, and possibly other or different user inputs.

Mobile station 102 sends communication signals to and receives communication signals from the wireless network 104 over a wireless link via antenna 110. RF transceiver circuitry 108 performs functions similar to those of a base station and a base station controller (BSC) (not shown), including for example modulation/demodulation and possibly encoding/decoding and encryption/decryption. It is also contemplated that RF transceiver circuitry 108 may perform certain functions in addition to those performed by a BSC. It will be apparent to those skilled in art that RF transceiver circuitry 108 will be adapted to particular wireless network or networks in which mobile station 102 is intended to operate.

Mobile station 102 includes a battery interface (IF) 134 for receiving one or more rechargeable batteries 132. Battery 132 provides electrical power to electrical circuitry in mobile station 102, and battery IF 132 provides for a mechanical and electrical connection for battery 132. Battery IF 132 is coupled to a regulator 136 which regulates power to the device. When mobile station 102 is fully operational, an RF transmitter of RF transceiver circuitry 108 is turned on only when it is sending to network, and is otherwise turned off or placed in a low-power mode to conserve power. Similarly, an RF receiver of RF transceiver circuitry 108 is typically periodically turned off to conserve power until it is needed to receive signals or information (if at all) during designated time periods.

Mobile station 102 operates using a Subscriber Identity Module (SIM) 140 which is connected to or inserted in mobile station 102 at a SIM interface (IF) 142. SIM 140 is one type of a conventional "smart card" used to identify an end user (or subscriber) of mobile station 102 and to personalize the device, among other things. Without SIM 140, the mobile station terminal is not fully operational for communication through the wireless network. By inserting SIM 140 into mobile station 102, an end user can have access to any and all of his/her subscribed services. SIM 140 generally includes a processor and memory for storing information. Since SIM 140 is coupled to SIM IF 142, it is coupled to controller 106 through communication lines 144. In order to identify the subscriber, SIM 140 contains some user parameters such as an International Mobile Subscriber Identity (IMSI). An advantage of using SIM 140 is that end users are not necessarily bound by any single physical mobile station. SIM 140 may store additional user information for the mobile station as well, including datebook (or calendar) information and recent call information.

Mobile station 102 may consist of a single unit, such as a data communication device, a multiple-function communication device with data and voice communication capabilities, a personal digital assistant (PDA) enabled for wireless communication, or a computer incorporating an internal modem. Alternatively, mobile station 102 may be a multiple-module unit comprising a plurality of separate components, including but in no way limited to a computer or other device connected to a wireless modem. In particular, for example, in the mobile station block diagram of FIG. 1, RF transceiver circuitry 108 and antenna 110 may be implemented as a radio modem unit that may be inserted into a port on a laptop computer. In this case, the laptop computer would include display 112, keyboard 114, one or more auxiliary UIs 116, and controller 106 embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a mobile station 102 may have a more particular implementation as described later in relation to mobile station 202 of FIG. 2.

Figure 2:
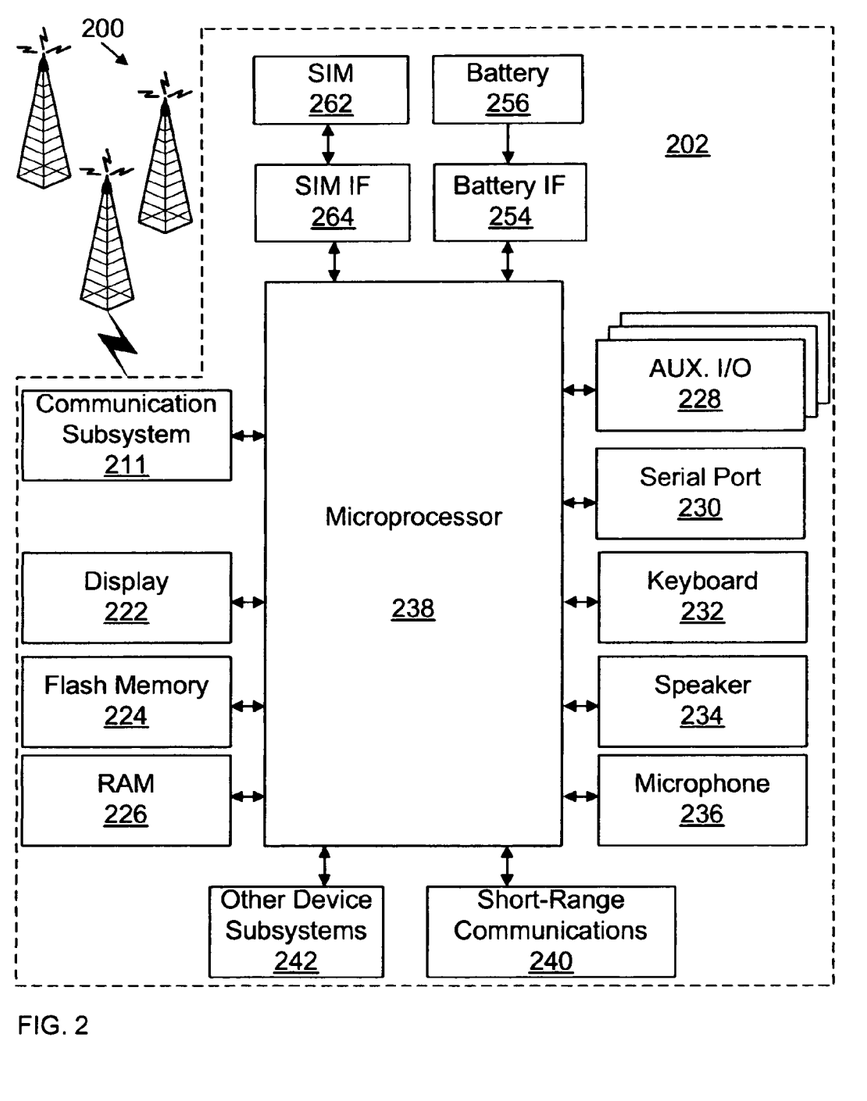
FIG. 2 is a more detailed diagram of a preferred wireless communication device of FIG. 1 in accordance with the prior art.

FIG. 2 is a detailed block diagram of a preferred mobile station 202. Mobile station 202 is preferably a two-way communication device having at least voice and advanced data communication capabilities, including the capability to communicate with other computer systems. Depending on the functionality provided by mobile station 202, it may be referred to as a data messaging device, a two-way pager, a cellular telephone with data messaging capabilities, a wireless Internet appliance, or a data communication device (with or without telephony capabilities). Mobile station 202 may communicate with any one of a plurality of fixed transceiver stations 200 within its geographic coverage area.

Mobile station 202 will normally incorporate a communication subsystem 211, which includes a receiver, a transmitter, and associated components, such as one or more (preferably embedded or internal) antenna elements and, local oscillators (LOs), and a processing module such as a digital signal processor (DSP) (all not shown). Communication subsystem 211 is analogous to RF transceiver circuitry 108 and antenna 110 shown in FIG. 1. As will be apparent to those skilled in field of communications, particular design of communication subsystem 211 depends on the communication network in which mobile station 202 is intended to operate.

Network access is associated with a subscriber or user of mobile station 202 and therefore mobile station 202 requires a Subscriber Identity Module or "SIM" card 262 to be inserted in a SIM IF 264 in order to operate in the network. SIM 262 includes those features described in relation to FIG. 1. Mobile station 202 is a battery-powered device so it also includes a battery IF 254 for receiving one or more rechargeable batteries 256. Such a battery 256 provides electrical power to most if not all electrical circuitry in mobile station 202, and battery IF 254 provides for a mechanical and electrical connection for it. The battery IF 254 is coupled to a regulator (not shown) which provides power V+ to all of the circuitry.

Mobile station 202 includes a microprocessor 238 (which is one implementation of controller 106 of FIG. 1) which controls overall operation of mobile station 202. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 202. A predetermined set of applications which control basic device operations, including at least data and voice communication applications, will normally be installed on mobile station 202 during its manufacture. A preferred application that may be loaded onto mobile station 202 may be a personal information manager for organizing and managing data items relating to the user such as, but not limited to, instant messaging (IM), e-mail, calendar events, voice mails, appointments, and task items. Naturally, one or more memory stores are available on mobile station 202 and SIM 262 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile station user's corresponding data items stored and/or associated with a host computer system thereby creating a mirrored host computer on mobile station 202 with respect to such items. This is especially advantageous where the host computer system is the mobile station user's office computer system. Additional applications may also be loaded onto mobile station 202 through network 200, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile station 202 and may provide enhanced on-device functions, communication-related functions, or both. For example, secure communication applications may enable electronic commerce functions and other such financial transactions to be performed using mobile station 202.

In a data communication mode, a received signal such as a text message, an e-mail message, or web page download will be processed by communication subsystem 211 and input to microprocessor 238. Microprocessor 238 will preferably further process the signal for output to display 222, to auxiliary I/O device 228 or both as described further herein below with reference to FIGS. 3-9. A user of mobile station 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication.

Short-range communications subsystem 240 of FIG. 2 is an additional optional component which provides for communication between mobile station 202 and different systems or devices, which need not necessarily be similar devices. For example, subsystem 240 may include an infrared device and associated circuits and components, or a Bluetooth™ communication module to provide for communication with similarly-enabled systems and devices. Bluetooth™ is a registered trademark of Bluetooth SIG, Inc.

In accordance with an embodiment of the invention, mobile station 202 is configured for sending and receiving data items and includes a PIM for organizing and managing data items relating to the user such as, but not limited to, instant messaging (IM), e-mail, calendar events, calendar appointments, and task items, etc. By way of example, mobile station 202 is configured for three instant messaging services and two e-mail services to which the user subscribes. To provide a user-friendly environment to control the operation of mobile station 202, PIM together with the operation system and various software applications resident on the station 202 provides a GUI having a main screen and a plurality of sub-screens navigable from the main screen.

Figure 3:
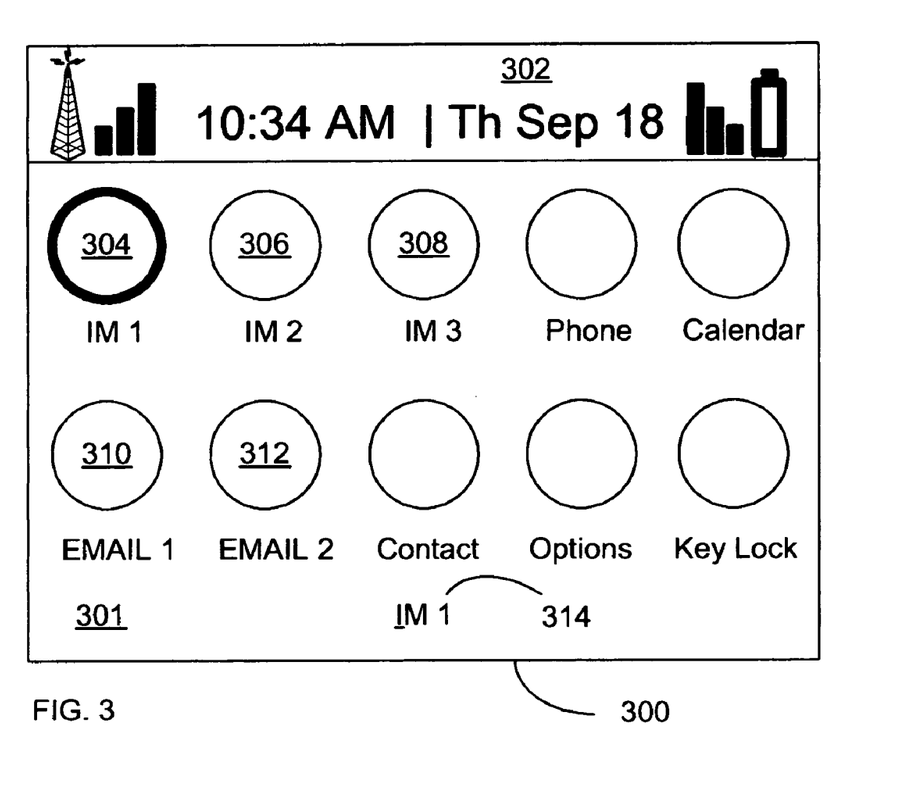
FIG. 3 is an illustration of an exemplary main screen, in accordance with the invention, for a wireless communication device such as the devices of FIGS. 1 and 2.

Referring now to FIG. 3, there is an illustration of an exemplary main screen 300, in accordance with an embodiment of the invention, for a display 112, 222 of mobile station 202 providing a graphical user interface for controlling mobile station 202. Main screen 300 is divided into two main portions, namely an application portion 301 for displaying and manipulating icons (e.g. 304-312) for various software applications and functions enabled by mobile station 202 and a mobile station status portion 302 for displaying status information such as time, date, battery and signal strength, etc. FIG. 3 illustrates three icons 304, 306 and 308 for respective IM applications IM 1, IM 2 and IM 3 and two icons 310, 312 for the two e-mail services Email 1 and Email 2. Associated with each icon is a name (e.g. IM 1) for the application for icon 304. The name may also be presented in a name region 314 of application portion 301.

Main screen 300 may not represent all application icons at once in application portion 301. A user may be required to navigate or scroll through the icons of application portion 301 to view additional application icons.

For simplicity, each icon is represented as a circle but persons of ordinary skill in the art will appreciate that other graphics may be used. In the exemplary main screen and GUI of mobile station 202, when a particular icon, e.g. 304, is selected or made active by a user (such as by manipulating keyboard 232 or other auxiliary I/O device 228), the icon 304 is changed such as by highlighting, shadowing or the like.

In accordance with an embodiment of the invention, an icon (e.g. 304) may be visually modified in response to a new event from the application associated with the icon to provide an immediate notification of the event via a change in main screen 300. The notification may distinguish the icon from icons for similar services to assist a user to control mobile station 202 as described further.

Figure 4:
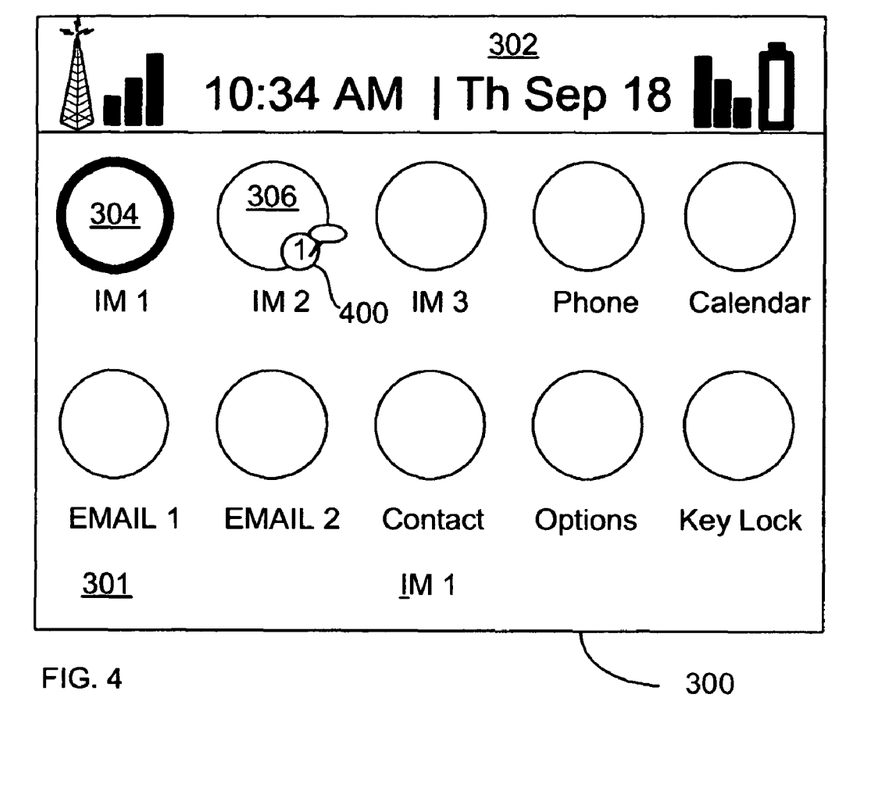
FIG. 4 is an illustration of the main screen of FIG. 3 after a new event.

Each of the icons in the main screen 300 of FIG. 3 is in an initial state indicating no new events have occurred and remain unattended by the user. FIG. 4 is an illustration of the main screen 300 after a new IM event, for example, a new message, has arrived into one of the IM applications, namely IM 2, associated with icon 306. In this exemplary embodiment, the new IM message is indicated with a visual modification 400 comprising a bubble, alluding to new received text, and a numeric indicator "1" representing a count of new events, which in this case are unread messages. Persons of ordinary skill in the art will appreciate that a visual modification 400 different from a bubble may be used and the count may represent other information, such as the number of correspondents or "buddies" from which one or more messages have been received but remain unread. In addition to indicating the number of unread messages, this mechanism may be used to reflect other new event information such as additional state information pertaining to the associated application. State information may include whether the user is currently signed in (and their user name), the state of the connection, and the current state of the user (away vs. available). In an e-mail application, such as associated with one of icons 310, 312, a count may be of unread e-mail messages or distinct senders of unread e-mail. Similar counts may represent SMS messages, appointments, alarms or other events for respective applications.

Optionally, the count may be configurable for each application or instance thereof. For application icon 304 it may identify the number of distinct senders of unread IM messages and for application icon 308 distinct unread IM messages.

Figure 5:
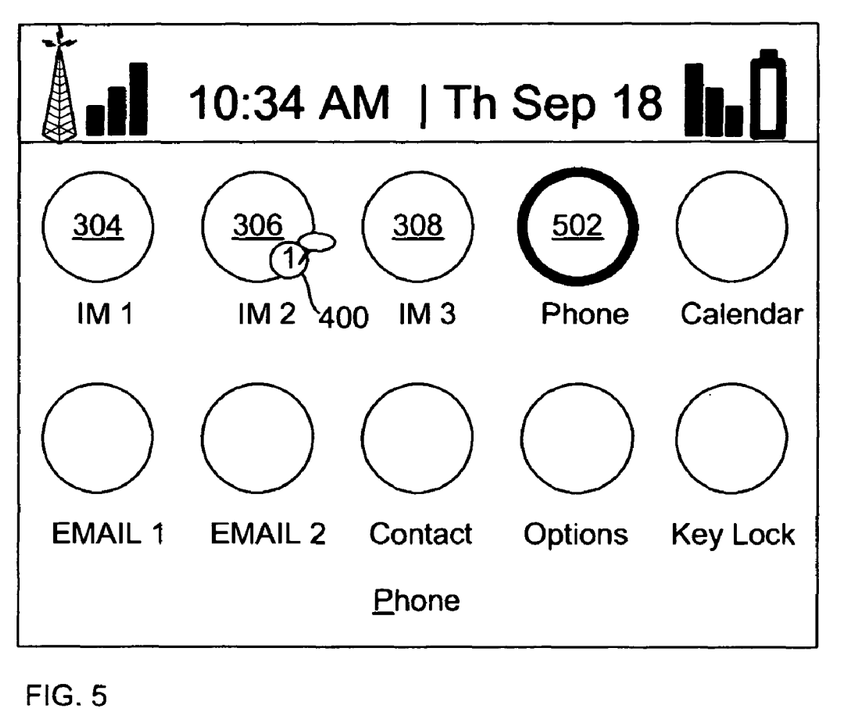
FIG. 5 is an illustration of the main screen of FIG. 4 following a user action.

FIG. 5 shows an IM application icon 306 following a user action. When the user of mobile station 202 moves the focus of main screen from icon 304 through 306 and 308 to highlight phone icon 502, visual modification 400 persists at icon 306 to maintain the visual modification and remind the user of the unread message. Preferably, only once the user activates an application and reads the unread message is the visual modification changed, for example, to decrease the count and, if applicable, remove the modification if the count is zero.

Figure 6:
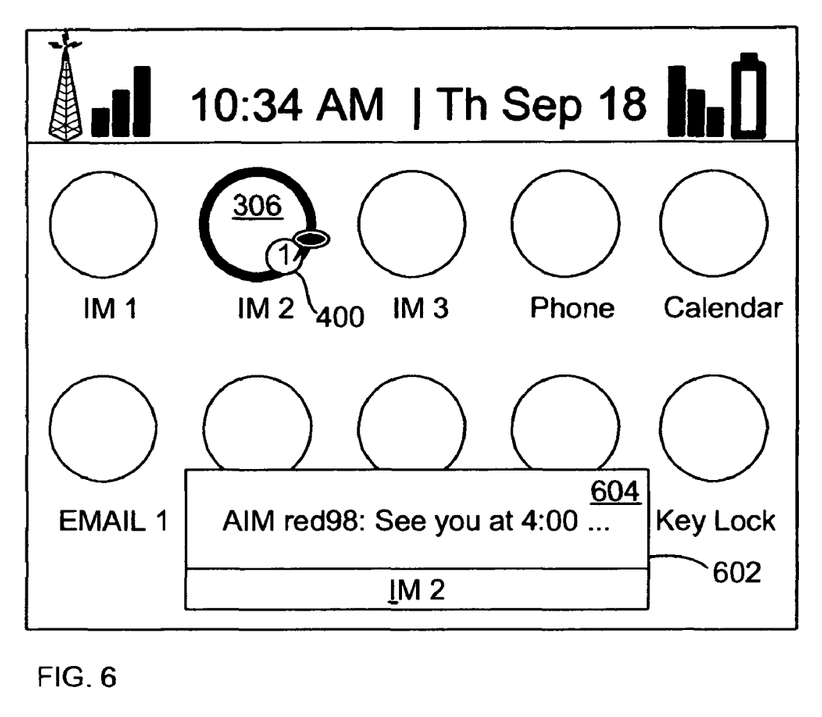
FIG. 6 is an illustration of a change to an IM application icon when the user selects the application icon with the new event.

FIG. 6 is an illustration of main screen 300 when IM application icon 306 having an unread message is highlighted. Upon selection of icon 306, in addition to highlighting the icon, a dialog box 602 comprising a message preview 604 of at least a portion of the unread message is displayed. The opening of the dialog box 604 may be briefly delayed after icon 306 is brought in focus by the user. If a dialog box is opened too quickly as a user navigates among the icons, navigation may be preempted before the user navigates to a particular icon of choice. Dialog box 604 is opened at name region 314 though persons skilled in the art will recognize that another region may be selected to position the dialog box 604. By way of example, message preview 604 in dialog box 602 shows the application service (i.e. "AIM" for AOL Instant Messenger) the correspondent sending the message (i.e. "red98") and a part of the unread message (i.e. "See you at 4:00 . . . ").

Figure 7:
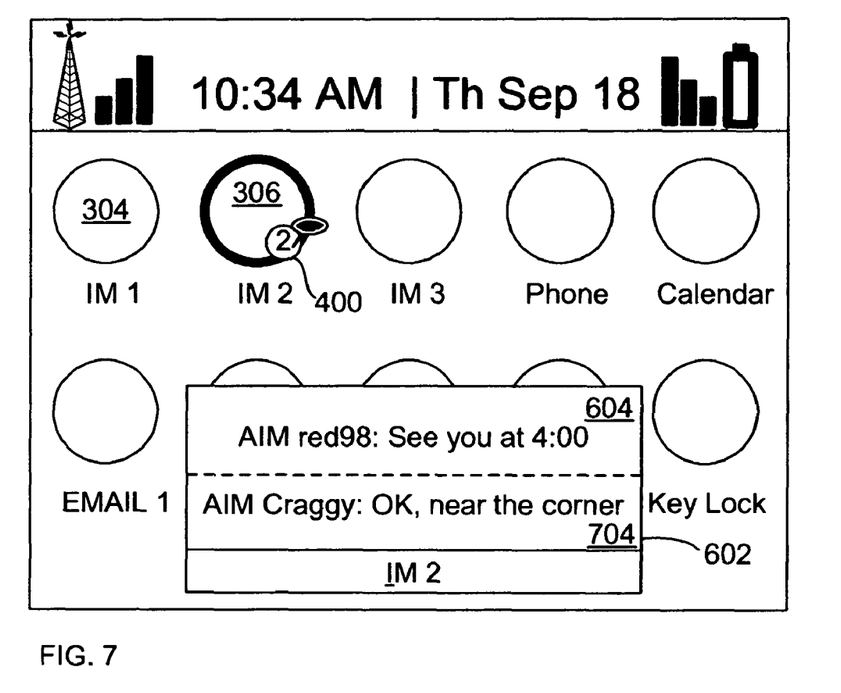
FIG. 7 is an illustration of multiple new events within one application.

FIG. 7 shows a dialog box 602 for an IM application 306 having two unread messages indicated at visual modification 400. Dialog box 602 comprises message previews 604 and 704. Due to the inherent size of main screen 300 and other considerations apparent to those skilled in the art, there is an upper limit to the number of unread messages that may be previewed in such a manner. This limit may be optionally configurable by a user within a predetermined range or simply configured to a maximum size based on the available screen space, font, etc.

Optionally, in accordance with an embodiment of the invention, a user may be enabled to "jump" (i.e. automatically navigate) to the unread message directly from the application icon on the main screen, eliminating any intervening screens that may normally be navigated to read messages when navigating the GUI for the associated application. For example, highlighted icon 306 may be activated as per normal (e.g. selecting "enter" on keyboard 232) and the application initiated to start at an unread message (e.g. most or least recent). The application's initial screen or buddies list may be skipped. The opportunity to "jump" may be time-limited and enabled only for a short period of time immediately following the occurrence of the new event, such as from about a few seconds to about 30 seconds. The "jump" activation anticipates the user's need to see the unread message.

Figure 8:
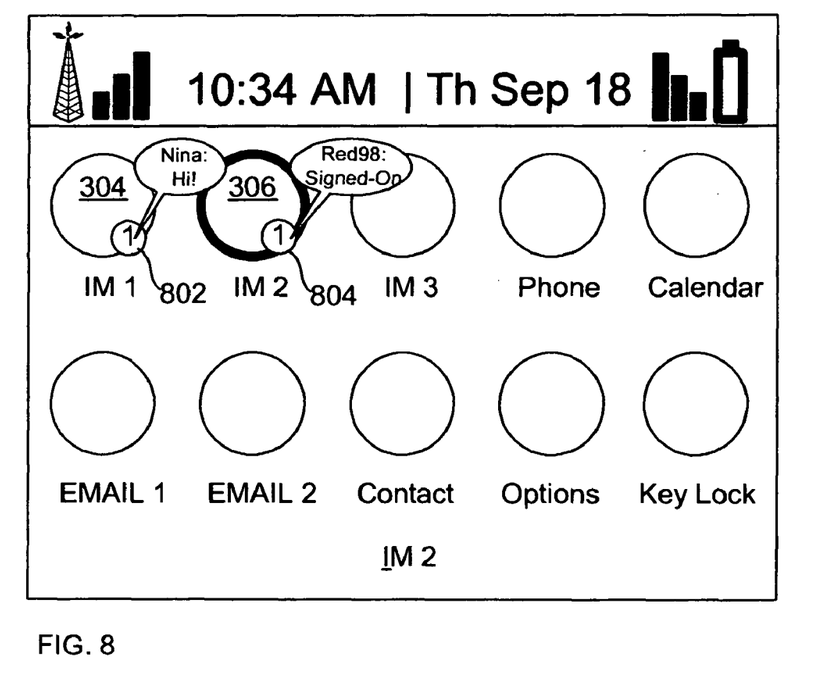
FIG. 8 is an illustration of further embodiments for previewing new events on the main screen.

FIG. 8 is an illustration of another embodiment for previewing events on a main screen of a mobile station such as station 202. In this embodiment, two new events, one for each of IM application icons 304, 306 are indicated via respective visual modifications 802 and 804. Visual modification 802 comprises an event count, namely a count of unread messages and a message preview providing a sender identity and a portion of the unread message. Similarly though differently modification 804 comprises an event count and state preview indicating IM correspondent buddy "Red98" has signed on. Persons of ordinary skill in the art will appreciate that different events may be visualized on the main screen in accordance with the invention and these events may depend upon the associated application.

Figure 9A:
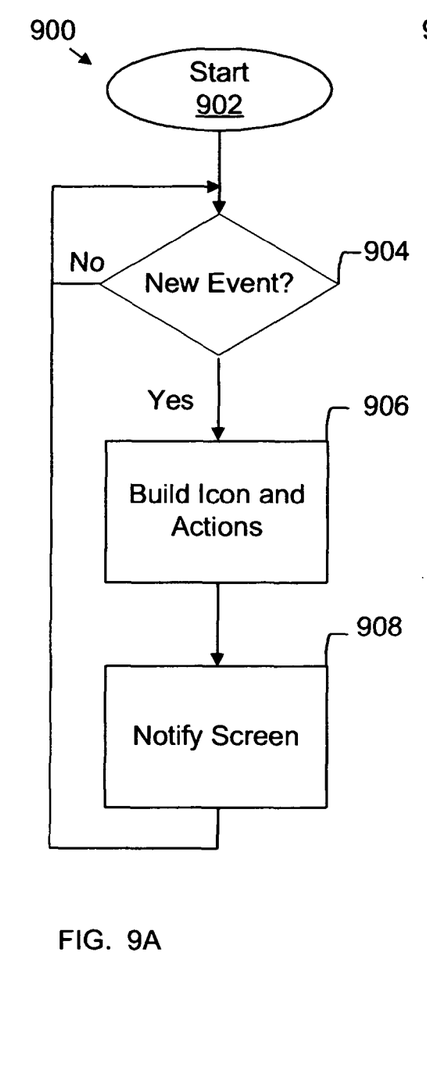
FIGS. 9A and 9B are flowcharts which describe a method in accordance with the invention.
Figure 9B:
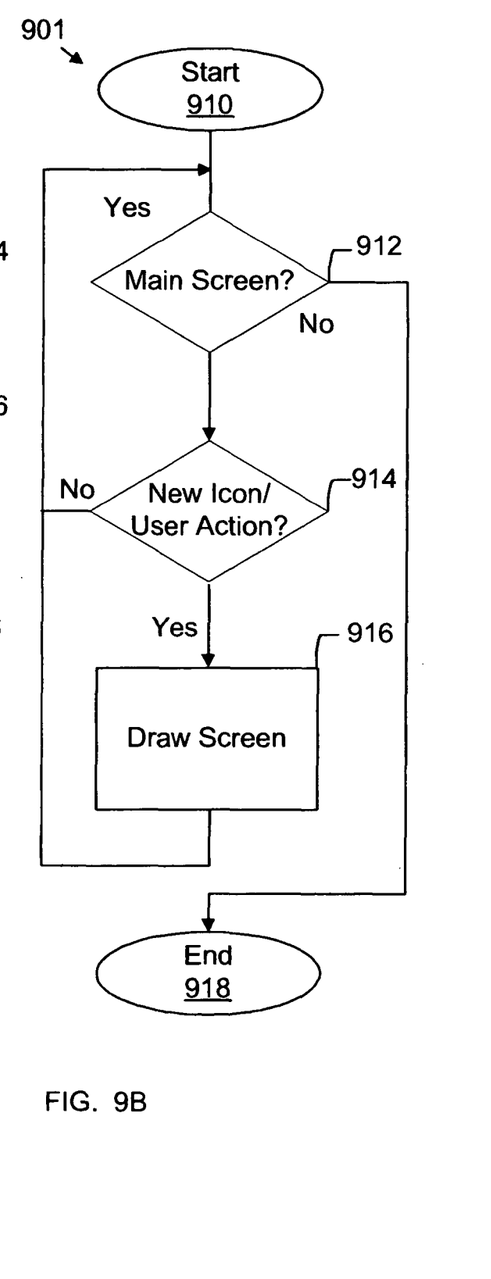

FIGS. 9A and 9B are flowcharts which describe a method in accordance with the invention for the visual modification of an application icon to represent a new event. FIG. 9A represents operations 900 for identifying a new event to determine the modification and FIG. 9B represents operations 901 to display the modification.

Operations 900 may be enabled for a service or other application such as IM, e-mail, etc. Though not shown events to be monitored (for example, by a monitoring component of the GUI) and visually indicated (for example, by a icon modifying component) upon occurrence are pre-determined in accordance with a type or types of events to be notified and previewed. For example, for operations 900 for use in accordance with IM, whether the count is to count distinct unread messages or senders is pre-determined.

Beginning at a start block 902 of FIG. 9A, operations 900 commence and the application represented by the application icon to be modified is monitored for a new event (step 904). Persons of ordinary skill in the art will understand that monitoring may be implemented in a number of fashions depending, in part, on operating system and other system services and the interface between communication subsystem 211 and microprocessor 238. Each of the plurality of applications to be monitored may have a dedicated monitoring component to determine the occurrence of respective new events. Alternatively, a single monitoring component could monitor each of the applications. Monitoring may be continuously or intermittently performed repeating step 904, until a new event is determined.

Upon a new event, at step 906, the visual modification to the icon to be changed is determined by an icon modifying component. The counter, if any, is incremented and any visual element or graphic to be overlaid may be configured. For example, text may be obtained for the overlay as exemplified by visual modification 802 of FIG. 8. The counter may be decremented if the monitored event is the reading of a previously unread message, for example.

User actions that may be performed in association with the modified icon may be set up. For example, text for a dialog box may be obtained in advance and associated with the visual modification for use when the icon is highlighted on the main screen by the user. Should the icon be activated to initiate the application, data to facilitate an immediate automatic jump to the most recent unread message may also be determined in advance if necessary, and associated with the visual modification. The sender of the message may be identified and various user action options prepared for that sender. For example, actions to permit a phone call, e-mail, SMS or other selectable message may be presented to a user highlighting an icon having a visual modification.

At step 908, the visual modification and any associated data, as applicable, is identified to a main screen maintenance portion of the PIM GUI or other application responsible for maintaining the main screen as described further with reference to operations 901. The notification may pass an object or other data sharing mechanism to provide the modification and any associated action data. Thereafter, monitoring continues at step 904 of operation 900. Monitoring may continue for as long as station 202 is powered.

Beginning at step 910, operations 901 commence for main screen maintenance. At step 912 operations monitor to determine that the main screen is active. If yes, operations monitor for a user action or a notification of a visual modification to an icon (step 914). Upon such an occurrence, a new screen is drawn reflecting the visual modification of an icon or the user's action (step 916, via Yes branch). Exemplary user actions are moving the focus or cursor over the icons of a main screen to highlight an icon or activating an application associated with the icon. The highlighting of an icon that was previously visually modified may further initiate a dialog box display requiring the drawing of the main screen as described above. Once the screen is drawn at step 916 or if no new icon or user activity is detected at step 914, operations 901 repeat at 912. At step 912, if the main screen is no longer active, for example because a user has navigated to another screen, operations 901 may cease (step 918 via No branch) until the main screen is reactivated (not shown).

Operations 900 illustrate a method aspect of an embodiment of the invention monitoring events of a single application. As will be understood to those of ordinary skill in the art, mobile station 202 may be configured to have multiple monitors, one for each application, or a single monitor configured to monitor all applications for new events. Alternatively, each type of application could have a monitor for monitoring respective instances of the application type. For example, a single monitor could be configured for monitoring the three IM applications of the above-described embodiment, a further monitor may be configured for the two e-mail applications, a further for the phone application, etc.

While operations 910 are illustrated as waiting to be advised of a new visual modification, other initiation mechanisms could be employed. For example, each application or respective monitor therefor could be queried for new visual modifications.

Though operation 900 and 901 are described with reference to new events, persons of ordinary skill in the art will appreciate that modifications may be incorporated therein to expire the preview of a new event and display a default or other icon for an application. For example, with reference to FIG. 8, icon 804 illustrates a status event preview, namely the sign-on of Red98. This preview may be expired automatically after a predetermined period of time. A standard or default icon could be used to replace the preview icon. Alternatively, a modified preview icon could be used such as one indicating a count of new events. Similarly, it may be desired to persist some new event previews information even upon the happening of subsequent new events for he same application. For example, new event information relating to a status of the associated application, (e.g. sign-in/out status, availability etc.) may be persisted even as new events occur and are previewed.

The above-described embodiments of the present application are intended to be examples only. Those of skill in the art may effect alterations, modifications and variations to the particular embodiments without departing from the scope of the application. The invention described herein in the recited claims intend to cover and embrace all suitable changes in technology.

What is claimed is:

1. A method of providing notifications of unread messages on a wireless communication device, comprising:
   displaying at least one icon relating to electronic messaging on a graphical user interface of the wireless communication device;
   receiving a plurality of electronic messages on the wireless communication device, the plurality of electronic messages including messages from a plurality of different messaging correspondents; and
   in response to receiving at least one of the plurality of electronic messages, visually modifying at least one displayed icon relating to electronic messaging to include a numeric character representing a count of the plurality of different messaging correspondents for which one or more of the electronic messages have been received and remain unread.

2. The method of claim 1, further comprising displaying a plurality of icons including one or more application icons that are selectable to invoke respective ones of a plurality of applications on the wireless communication device.

3. The method of claim 2, further comprising visually modifying one or more of the plurality of icons to include a count of electronic messages that have been received and remain unread.

4. The method of claim 1, the at least one icon relating to electronic messaging being selectable to invoke an electronic messaging application.

5. The method of claim 1, comprising displaying on the graphical user interface an identifier of the correspondent from whom at least one of the plurality of messages was received.

6. The method of claim 1, comprising displaying on the graphical user interface at least one preview of content associated with at least one of the received electronic messages.

7. A computer-readable memory accessible by a processor of a wireless communication device, the memory comprising stored electronic data structures representing executable instructions which, when executed by the processor, cause the wireless communication device to:
   display at least one icon relating to an electronic messaging application on the graphical user interface;
   receive a plurality of electronic messages, the plurality of electronic messages including messages from a plurality of different messaging correspondents; and
   in response to receiving at least one of the plurality of electronic messages, visually modify at least one displayed icon relating to the electronic messaging application to include a numeric character representing a count of the plurality of different messaging correspondents for which one or more of the electronic messages have been received and remain unread.

8. The computer-readable memory of claim 7, further comprising stored electronic data structures representing executable instructions which, when executed, cause the wireless communication device to display a plurality of icons including one or more application icons that are selectable to invoke respective ones of a plurality of applications on the wireless communication device.

9. The computer-readable memory of claim 8, further comprising stored electronic data structures representing executable instructions which, when executed, cause the wireless communication device to visually modify one or more of the plurality of icons to include a count of electronic messages that have been received by the wireless communication device and remain unread.

10. The computer-readable memory of claim 7, the at least one icon relating to electronic messaging being selectable to invoke an electronic messaging application.

11. The computer-readable memory of claim 7, stored electronic data structures representing executable instructions which, when executed, cause the wireless communication device to visually modify the graphical user interface to include an identifier of the correspondent from whom at least one of the plurality of messages was received.

12. The computer-readable memory of claim 7, further stored electronic data structures representing executable instructions which, when executed, cause the wireless communication device to visually modify the graphical user interface to include at least one preview of content associated with at least one of the received electronic messages.

13. A wireless communication device comprising:
   a processor;
   a display electrically coupled to the processor, the display presenting a graphical user interface; and
   memory storing machine-readable instructions executable by the processor to:
   display at least one icon relating to electronic messaging on the graphical user interface;
   receive a plurality of electronic messages, the plurality of electronic messages including messages from a plurality of different messaging correspondents; and
   in response to receiving at least one of the plurality of electronic messages, visually modify the at least one displayed icon relating to electronic messaging to include a numeric character representing a count of the plurality of different messaging correspondents for which one or more of the electronic messages have been received and remain unread.

14. The wireless communication device of claim 13, the memory further comprising machine-readable instructions which, when executed, cause the wireless communication device to display a plurality of icons including one or more application icons that are selectable to invoke respective ones of a plurality of applications on the wireless communication device.

15. The wireless communication device of claim 14, the memory comprising machine-readable instructions which, when executed, cause the wireless communication device to visually modify one or more of the plurality of icons to include a count of electronic messages that have been received and remain unread.

16. The wireless communication device of claim 13, the at least one icon relating to electronic messaging being selectable to invoke an electronic messaging application.

17. The wireless communication device of claim 13, the memory further comprising machine-readable instructions which, when executed, cause the wireless communication device to visually modify the graphical user interface to include an identifier of the correspondent from whom at least one of the plurality of messages was received.

18. The wireless communication device of claim 13, the memory further comprising machine-readable instructions which, when executed, cause the wireless communication device to visually modify the graphical user interface to include at least one preview of content associated with at least one of the received electronic messages.

* * * * *